(12) United States Patent
Hossain et al.

(10) Patent No.: US 11,927,761 B1
(45) Date of Patent: Mar. 12, 2024

(54) HEAD-MOUNTED DISPLAY SYSTEMS

(71) Applicant: Apple Inc., Cupertino, CA (US)

(72) Inventors: Muhammad F. Hossain, Sunnyvale, CA (US); Syed F. Mohiuddin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/346,059

(22) Filed: Jun. 11, 2021

Related U.S. Application Data

(60) Provisional application No. 63/054,715, filed on Jul. 21, 2020.

(51) Int. Cl.
*G02B 27/01* (2006.01)

(52) U.S. Cl.
CPC ..... *G02B 27/0176* (2013.01); *G02B 27/0172* (2013.01); *G02B 2027/0178* (2013.01); *G02B 2027/0187* (2013.01)

(58) Field of Classification Search
CPC ............ G02B 27/0176; G02B 27/0172; G02B 2027/0178; G02B 2027/0187
See application file for complete search history.

(56) References Cited

U.S. PATENT DOCUMENTS

| | | | |
|---|---|---|---|
| 6,078,351 A | 6/2000 | Hall, Jr. et al. | |
| 7,050,655 B2 | 5/2006 | Ho et al. | |
| 7,199,934 B2 | 4/2007 | Yamasaki | |
| 8,711,061 B2 | 4/2014 | Reichow et al. | |
| 9,406,166 B2* | 8/2016 | Futterer | G02B 6/0016 |
| 9,785,306 B2* | 10/2017 | Yang | G06F 3/017 |
| 9,848,169 B2 | 12/2017 | McNelley et al. | |
| 10,310,265 B2 | 6/2019 | Giwnewer et al. | |
| 2006/0119539 A1* | 6/2006 | Kato | G02B 27/0176 345/8 |
| 2013/0107145 A1* | 5/2013 | Ueki | G02B 30/24 349/13 |
| 2013/0258461 A1* | 10/2013 | Sato | G02B 27/01 359/464 |
| 2015/0346832 A1* | 12/2015 | Cole | H04N 19/597 345/156 |

(Continued)

FOREIGN PATENT DOCUMENTS

WO WO-2023021732 A1 * 2/2023

*Primary Examiner* — Sahlu Okebato
(74) *Attorney, Agent, or Firm* — Treyz Law Group, P.C.; G. Victor Treyz; Tianyi He

(57) ABSTRACT

A head-mounted device may have a head-mounted housing. The head-mounted housing may have rear-facing display that displays a three-dimensional image to rear eye boxes. The head-mounted device may also have a front-facing display that faces away from the rear eye boxes. The front-facing display may cover a front face of the head-mounted housing. To share content such as content being displayed by the rear-facing displays with external viewers, the head-mounted device may use the front-facing display or a separate display to display images. An accessory that is coupled to the front face of the housing may reflect an image on the front-facing display towards a viewer for viewing. Sensors in the device may detect presence of the accessory. Display projectors and waveguides or optical layers on the front face that overlap the front-facing display may be used to display three-dimensional images to front eye boxes.

21 Claims, 7 Drawing Sheets

(56) References Cited

U.S. PATENT DOCUMENTS

2019/0171023 A1\* 6/2019 Carlvik .............. G02B 27/0176
2019/0384062 A1\* 12/2019 Wilson ................. G06F 1/1656
2020/0333596 A1\* 10/2020 Yoon ..................... G06T 19/006

\* cited by examiner

HEAD-MOUNTED DISPLAY SYSTEMS

This application claims the benefit of provisional patent application No. 63/054,715, filed Jul. 21, 2020, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

An electronic device such as a head-mounted device may include displays for displaying visual content for a user. A head-mounted support structure may be used to support rear-facing displays. The rear-facing displays may be display left and right images that are viewable through respective left and right lenses from rear eye boxes located at a rear face of the head-mounted support structure. A front-facing display may be mounted on an opposing front face of the head-mounted support structure.

To share visual content such as three-dimensional content that is being viewed by a user who is wearing a head-mounted device, the head-mounted device may receive an accessory. The accessory may have reflective layers configured to form an inverted pyramid on the front-facing display. By displaying images on the front-facing display around the periphery of the pyramid, the accessory can reflect image light towards an external viewer other than the user. This creates a corresponding virtual image that floats in three-dimensional space in an area between the reflective layers. The viewer can change their orientation relative to the accessory and can view the accessory from different directions while continuing to view a floating virtual image. The image therefore appears to be three-dimensional to the viewer.

In another illustrative configuration, display projectors produce images, waveguides convey the images across the front of the front-facing display, and output couplers couple the images out of the waveguides toward front eye boxes at the front face of the head-mounted support structure. The waveguides and output couplers may overlap the front-facing display, so that the front-facing display may be viewed through the waveguides and output couplers. When it is desired to share three-dimensional content with an external viewer whose eyes are located in the front eye boxes, the front-facing display may be turned off and images from the display projectors may be routed to the front eye boxes through the waveguides and output couplers.

If desired, the front-facing display may be overlapped with an optical component such as a lenticular lens array or parallax barrier. The optical component may route part of the image light from the front-facing display to a left front eye box and may route another part of the image light from the front-facing display to a right front eye box. This arrangement allows the front-facing display to display three-dimensional (stereoscopic) content in the front eye boxes. Three-dimensional content may also be presented in the front eye boxes using switchable reflectors (e.g., switchable mirrors and other optical components that route light from the rear-facing displays to the front eye boxes).

DETAILED DESCRIPTION

Head-mounted devices include head-mounted support structures that allow the devices to be worn on the heads of users. Displays may be used for presenting the user with visual content.

A head-mounted device may have left and right displays for displaying left and right images to left and right eye boxes for viewing by the user. This allows the user to be presented with three-dimensional content (stereoscopic images). The head-mounted device may also be provided with one or more externally facing (publicly viewable) displays. This allows content that is being displayed for a user to be shared with others who are nearby. In some arrangements, three-dimensional content can be presented for nearby viewers. If desired, the same content (or similar content) can be displayed on a user-facing display and on an externally facing three-dimensional public display (e.g., three-dimensional content may be shared). Structures for facilitating public viewing of content (e.g., three-dimensional content) can be incorporated into the head-mounted device or may be provided using an accessory that is removably coupled to the head-mounted device.

Figure 1:
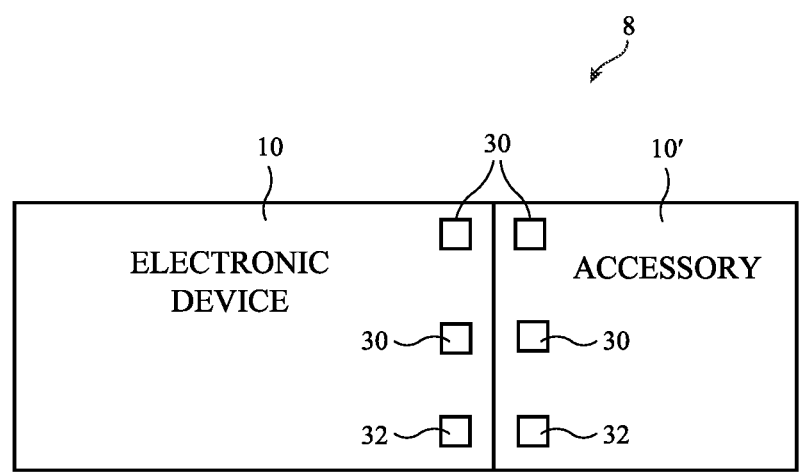
FIG. 1 is a schematic diagram of an illustrative electronic device such as a head-mounted display device coupled to a removable accessory in accordance with an embodiment.

A schematic diagram of an illustrative system that may include a head-mounted device and removable accessory is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example. Head-mounted devices may include goggles, helmets, glasses, sleep masks, and/or other equipment that may be worn over a user's eyes.

System 8 may include accessories such as accessory 10'. Accessory 10' may be used to help an external viewer view content such as three-dimensional content (or content that appears to be three-dimensional) that is being shared with the user of device 10 or may be used to present other content. Accessory 10' may be removably coupled to device 10 using attachment structures 30. Structures 30 may include magnets and/or magnetic material attracted to magnets that help attract and hold accessory 10' against device 10 and vice versa, may include interlocking engagement structures (e.g., clips, snaps, etc.), may include screws and other fasteners, may include housing structures configured to form press-fit connections, and/or may include other attachment structures that can removably attach device 10 and accessory 10'. Sensors such as sensors 32 may be used by device 10 and/or accessory 10' to sense when device 10 and accessory 10' have been coupled to each other. Sensors 32 may include magnetic sensors configured to detect the presence or absence of a magnet to detect coupling, may be an optical sensor that detects the presence of coupling, may be a force sensor, capacitive sensor, a switch, and/or other sensor that detects coupling, and/or may include other sensors for detecting when device 10 and accessory 10' have been attached to each other. In response to detecting coupling, control circuitry in device 10 and/or accessory 10' may take appropriate action (e.g., a display in device 10 may be configured to change its mode of operation to help ensure that an external viewer can use accessory 10' to view content such as shared content).

Figure 2:
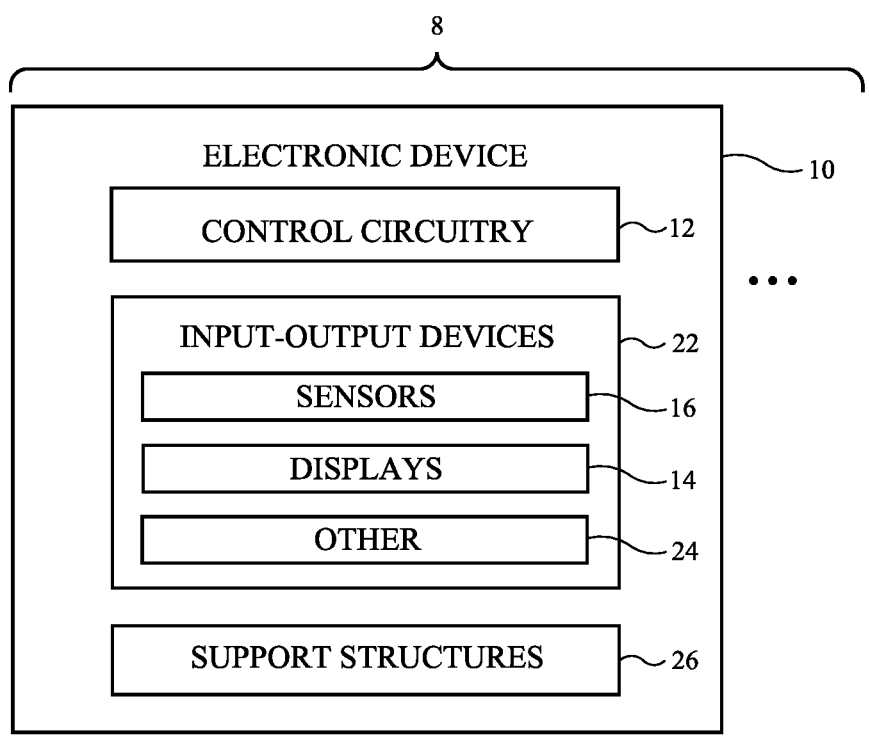
FIG. 2 is schematic diagram of an illustrative system with an electronic device in accordance with an embodiment.

FIG. 2 is a schematic diagram of system 8. System 8 may have one or more electronic devices 10 (and/or one or more accessories 10', which may each include some or all of the resources of device 10). As shown in FIG. 2, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 2, input-output devices 22 may include one or more displays such as displays 14. In some configurations, device 10 includes left and right display devices. Device may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively. Displays 14 may also be used to display publicly viewable content for viewers other than the user.

During operation, displays 14 may be used to display visual content for a user of device and/or for an external viewer. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles).

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structure 26 of FIG. 2. Support structure 26 may include head-mounted support structures (e.g., a helmet housing, head straps, temples in a pair of eyeglasses, goggle housing structures, a mask covering layer, and/or other head-mounted structures). The head-mounted support structures may be configured to be worn on a head of a user (e.g., over the user's eyes) during operation of device 10 and may support displays 14, sensors 16, other components 24, other input-output devices 22, and control circuitry 12.

Figure 3:
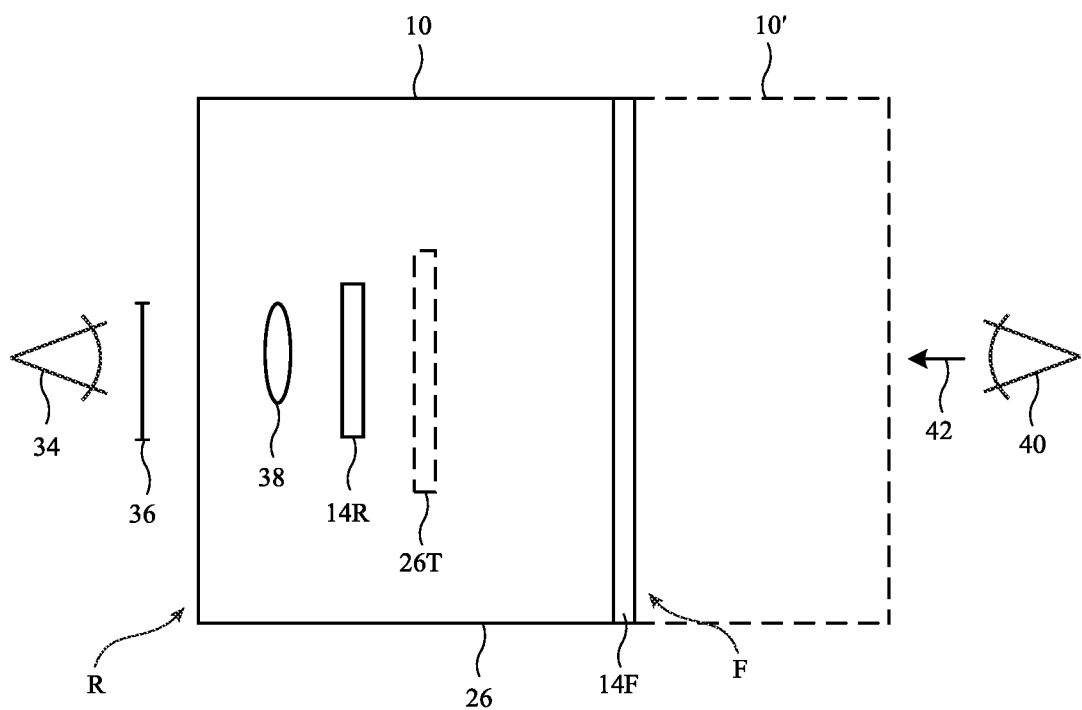
FIG. 3 is a side view of an illustrative electronic device and accessory in accordance with an embodiment.

FIG. 3 is a cross-sectional side view of device 10 showing how an associated accessory 10' may be removably coupled to device 10. As shown in FIG. 3, electronic device 10 may include head-mounted support structure 26 to house the components of device 10 and to support device 10 on a user's head. Support structure 26 may include, for example, structures that form housing walls and other structures near front face F of device 10. These front-face structures face away from the wearer of device 10 and may help support a publicly viewable outward-facing display such as display 12F in a location where images may be viewed by an external viewer who is not currently wearing device 10 (see, e.g., viewer 42 who is viewing device 10 in direction 42). Support structure 26 may also have housing structures on rear face R that are configure to rest against the user's face. Support structure may have straps and other supplemental support structures (e.g., support structures 26T) that help to hold structure 26 and the components in structure 26 on a user's face so that the user's eyes 34 are located within eye boxes (eye locations) such as eye box 36.

During operation of device 10, images may be presented to a user's eyes in eye boxes 36. Eye boxes 36, which are at the rear face of device 10 and which may sometimes be referred to as rear eye boxes, include a left eye box that receives a left image and a right eye box that receives a right image. Device 10 may include a left display system with a left display 14 that presents the left image to the left eye box and a right display system with a right display 14 that presents the right image to the right eye box. In the side view of FIG. 3, a single user-facing display 14R and a single corresponding lens 38 through which an image on display 14R is viewable by the user's eye 34 in eye box 36 is shown.

In the absence of accessory 10', device 10 may, if desired, present images for viewing by viewer 40 on front-facing display 14F, which may overlap some or all of front face F of support structure 26 and device 10. In the presence of accessory 10', accessory 10' may help display images for viewer 40.

Figure 4:
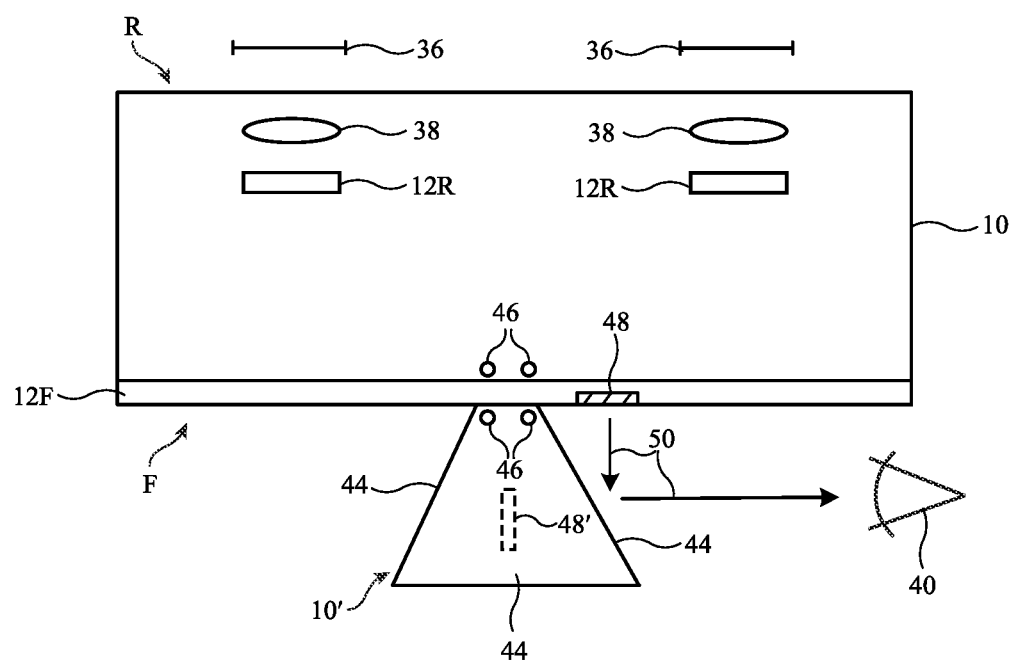
FIG. 4 is a top view of an illustrative electronic device and accessory in accordance with an embodiment.

FIG. 4 is a top view of system 8 in an illustrative configuration in which accessory 10' has partially reflective transparent panels such as panels 44. Panels 44 may, as an example, include three of four separate triangularly shaped layers arranged to form a hollow air-filled inverted pyramid. Panels 44 may be formed from polymer sheets, glass layers, and/or other transparent layers and may optionally be coated to adjust the amount of light reflection exhibited by panels 44. Panels 44 may, as an example, be configured to exhibit a reflectance of 10-90%, or other suitable value.

Components 46 (e.g., attachment structures 30 and/or sensors 32 of FIG. 1) may be provided in accessory 10' and device 10. These components may help removably attach accessory 10' to front face F of device 10, may help align accessory 10' relative to front-facing display 14F and other portions of device 10, and may be used in sensing when accessory 10' and device 10 are or are not coupled.

During use of device 10 by a user who is wearing device 10, images from rear-facing displays 14R may be viewed by the user from rear eye boxes 36 through lenses 38. At the same time, forward-facing display 14F may be used to display publicly viewable content for viewing by external viewer 40 at the front face of device 10. It may be desirable, for example, to display some or all of the same content that is being displayed on displays 14R using display 14F. This allows people in the vicinity of device 10 and the user of device 10 to be informed on the activities of the user and share in the visual content being experienced by the user.

In some configurations, the content on forward-facing display 12F may be configured to reflect from the reflective surfaces of panels 44. This may provide viewer 40 with the ability to view content on display 14F that appears to be three-dimensional (e.g., floating in space like a hologram). Four images for viewing by viewer 40 may, as an example, be displayed adjacent to each of four respective sides of the inverted pyramid formed by panels 44. An illustrative one of these four images (illustrative image 48) is shown in FIG. 4. Due to the presence of reflective panel 44, image 48 reflects from the surface of panel 44 towards viewer 40. This reflection creates a virtual image that floats above the surface of display 14F in the interior of the inverted pyramid between panels 44 as shown by virtual image 48' of FIG. 4. When panels 44 are partially transparent, viewer 40 can also view real-world objects in the background through panels 44. This creates a visual impression that image 48' is a three-dimensional image that is floating in space above the surface of display 14F.

Device 10 may receive input from a user (e.g., a voice command, eye gesture command, a touch command or other command provided to an input-output device on device 10 or to an input-output device in an associated controller). Device 10 may also automatically detect the presence of accessory 10' using a sensor (e.g., sensor 32 of FIG. 1). In response to a sensor measurement indicating that accessory 10' is present and/or in response to user input indicating that accessory 10' is present, device 10 may change its operation to an operating mode in which images for reflecting from panels 44 such as image 48 are displayed around the periphery of accessory 10' (e.g., on all four sides of the four-sided pyramidal structure formed by panels 44 in the example of FIG. 4) rather than displaying a blank screen or a regular two-dimensional image extending across the entire surface of display 12F. In response to a sensor measurement and/or user input indicating that accessory 10' is no longer present, device 10 can change its operation to an operating mode in which the content of image 48 is displayed as a single image on the front of display 14F and/or in which the multiple images for reflection from the pyramidal structure formed by panels 44 are otherwise removed from display 14F.

Figure 5:
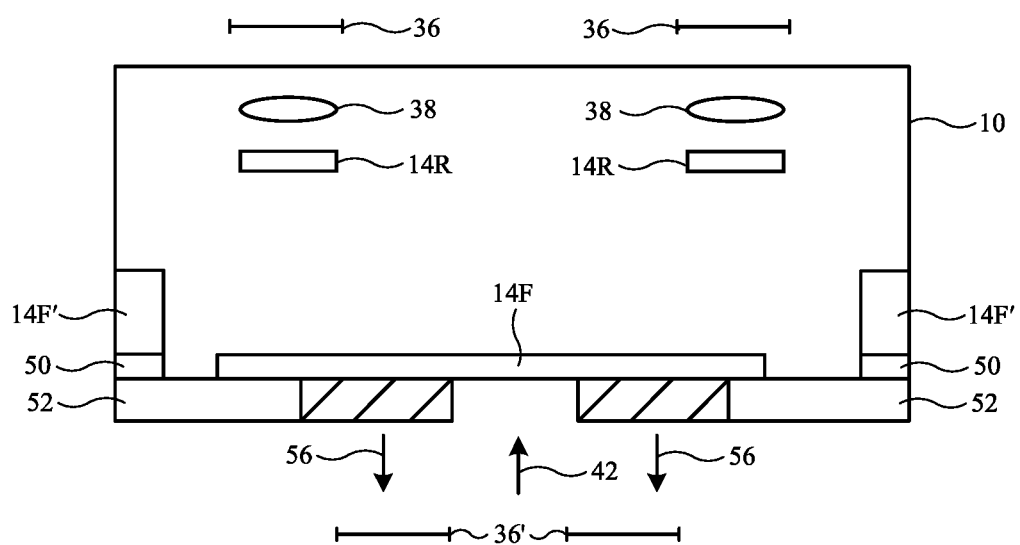
FIG. 5 is a cross-sectional top view of an illustrative electronic device in accordance with an embodiment.

In the illustrative arrangement of FIG. 5, device 10 has rear-facing displays 14R that display images through lenses 38 to a user at rear eye boxes 36 while device 10 is being worn on a user's head. Device 10 also has a forward-facing display such as display 14F that can be viewed in direction 42 by an external viewer. Another type of display present in device 10 of FIG. 5 is formed from a pair of display projectors (display devices) 14F'. In the example of FIG. there is a left display projector that displays a left image in the forward direction (away from rear eye boxes 36) and a right display projector that displays a right image in the forward direction. Optical couplers 50 may be used in coupling these images from display projectors 14F' into respective left and right waveguides 52. The images are conveyed within waveguides 52 in accordance with the principle of total internal reflection until reaching output couplers 54. At output couplers 54 (e.g., diffractive optical elements such as diffraction gratings formed from holograms or other diffraction gratings), the images in waveguides 52 are coupled out of waveguides 52 towards external viewer eye boxes (e.g., front eye boxes 36') in directions 56. The left and right images in front eye boxes 36' may differ to create a stereoscopic three-dimensional fused image. External viewers may therefore place their eyes in front eye boxes 36' to view three-dimensional content (e.g., content shared with the content displayed on displays 14R).

Output couplers 54 and waveguides 52 may be transparent structures (e.g., thin strips of glass or polymer). As a result, image present on display 14F may be viewed through output couplers 54 and waveguides 52. It may therefore be desirable to turn display 14F off to avoid creating images that could interfere with the images produced by display projectors 14F' whenever projectors 14F' are active. When projectors 14F' are not active and when it is desired to when display two-dimensional content on display 14F, display 14F may be turned on and used to display two-dimensional images. A viewer may view these images in direction 42 (e.g., through overlapping transparent structures such as waveguides 52 and output couplers 54).

Figure 6:
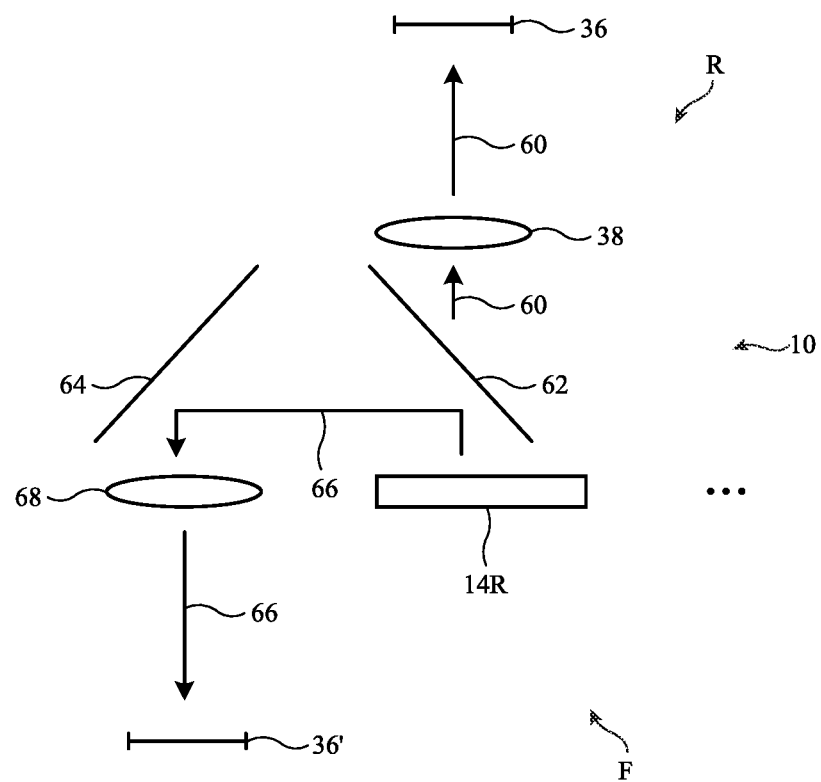
FIG. 6 is a top view of an illustrative optical system in an electronic device in accordance with an embodiment.

In the example of FIG. 6, device 10 has reflective structures (e.g., mirrors, switchable mirrors, etc.) that allow images from displays 14R to be routed to the rear of device 10 and to the front of device 10. In the illustrative arrangement of FIG. 6 (which shows components associated with one half of device 10), rear-facing display 14R generates an image that travels in rearward direction 60 through lens 38 to rear eye box 36 at the rear (rear face R) of device 10 for viewing by a user wearing device 10. Optical component 62 may be partially reflective mirror or a switchable mirror (e.g., an electronically adjustable device such as a cholesteric liquid crystal device that exhibits an electrically adjustable mirror reflectivity). In addition to passing the image from display 14R to eye box 36, component 62 may pass this image to external eye box 36' in the front of device 10 (e.g., near front face F). For example, component 62 may be configured to statically reflect one half or other fraction of the image from display 14R along path 66 and/or may be electrically switched into a reflective state (e.g., in a time-interleaved fashion) to reflect an image from display 14R along path 66. The image passing along path 66 may reflect from mirrors such as mirror 64 and may pass through lenses such as lens 68 to allow this image to be viewed by an external viewer having an eye located in front eye box 36'. The images displayed in rear eye boxes 36 and front eye boxes 36' may be identical (as an example). By providing a pair of displays 14R and a pair of associated optical systems of the type shown in FIG. 6, device 10 can simultaneously display three-dimensional content to a pair of user-viewable eye boxes 36 and to a pair of externally-viewable eye boxes 36' (e.g., stereoscopic images may be provided at the front and rear of device 10). This allows an external viewer to share in viewing the three-dimensional content being experienced by a user.

Figure 7:
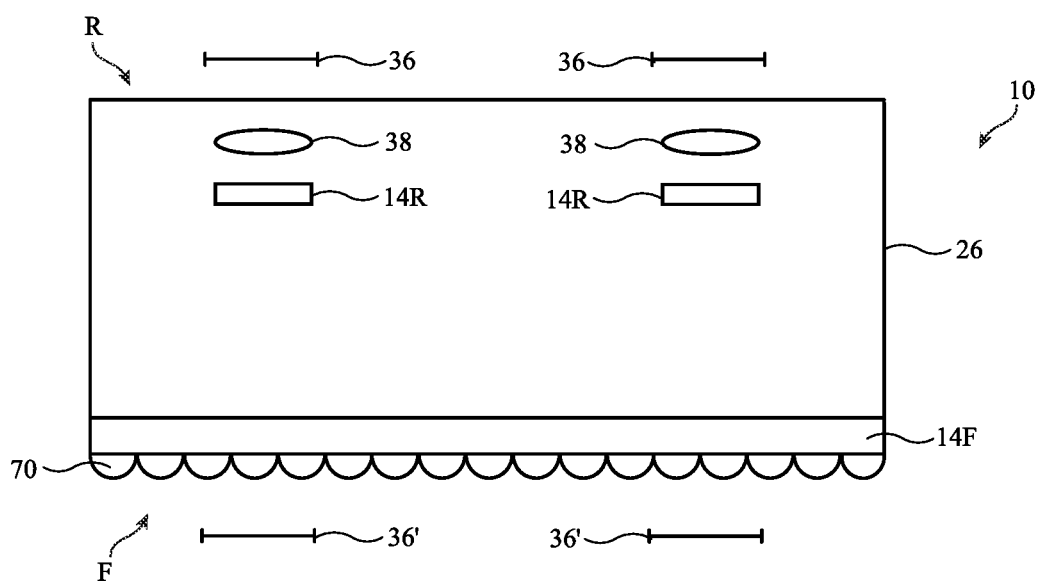
FIG. 7 is a top view of an illustrative electronic device in accordance with an embodiment.

In the illustrative configuration of device 10 that is shown in FIG. 7, device 10 has an optical layer such as layer 70 that covers some or all of front-facing display 14F. Rear-facing displays 14R may be mounted in support structure 26 to provide images through lenses 38 to a user who is wearing head-mounted device 10 (e.g., images viewable by the user in eye boxes 36). Layer 70 may be a lenticular lens array (e.g., a series of elongated cylindrical lenses each of which overlaps multiple columns of pixels in display 14F, other elongated lens elements, arrays of micro-lenses, etc.), may be a parallax barrier, or may be any other optical component (optical layer) that allows separate left and right images to be presented respectively to the left and right front eye boxes (e.g., to create fused stereoscopic images and thereby allow three-dimensional content to be displayed by display 14F in eye boxes 36').

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
a head-mounted support structure having a rear face and an opposing front face;
left and right lenses in the head-mounted support structure;
left and right rear-facing displays configured to provide respective left and right rear images at the rear face viewable from rear left and right eye boxes through the left and right lenses; and
an optical system through which a three-dimensional image is viewable from front left and right eye boxes at the front face.

2. The head-mounted device defined in claim 1 wherein the optical system comprises left and right display projectors, left and right waveguides that convey images respectively from the left and right display projectors, and output couplers configured to direct the conveyed images from the left and right waveguides respectively to the front left and right eye boxes at the front face.

3. The head-mounted device defined in claim 2 further comprising a front-facing display on the front face of the head-mounted support structure that is configured to display a front-facing image that is viewable through the output couplers.

4. The head-mounted device defined in claim 3 further comprising control circuitry configured to turn off the left and right display projectors while the front-facing image is being displayed on the front-facing display.

5. The head-mounted device defined in claim 1 wherein the optical system comprises a front-facing display on the front face and wherein the left and right rear-facing displays are between the front-facing display and the rear left and right eye boxes.

6. The head-mounted device defined in claim 5 wherein the optical system comprises a lenticular lens array overlapping the front-facing display.

7. The head-mounted device defined in claim 5 wherein the optical system comprises a parallax barrier overlapping the front-facing display.

8. The head-mounted device defined in claim 1 wherein the optical system comprises a reflective device configured to reflect image light from the left and right rear-facing displays along a path to the front left and right eye boxes at the front face.

9. The head-mounted device defined in claim 8 wherein the reflective device comprises a switchable mirror.

10. A head-mounted device, comprising:
a head-mounted support structure;
a rear-facing display that is supported by the head-mounted support structure and that is configured to display a three-dimensional image to rear eye boxes;
a front-facing display on the head-mounted support structure facing away from the rear eye boxes, wherein the front-facing display comprises a pixel array and wherein the rear-facing display is disposed between the pixel array and the rear eye boxes; and an optical system configured to display the three-dimensional image in front eye boxes located in front of the front-facing display.

11. The head-mounted device defined in claim 10 wherein the optical system comprises a layer that overlaps the front-facing display and wherein the front-facing display is configured to display content that is used in forming the three-dimensional image in the front eye boxes.

12. The head-mounted device defined in claim 10 wherein the optical system comprises a waveguide.

13. The head-mounted device defined in claim 12 wherein the optical system comprises left and right display projectors.

14. The head-mounted device defined in claim 10 wherein the optical system comprises display projectors configured to produce images for the front eye boxes.

15. The head-mounted device defined in claim 14 wherein the optical system comprises waveguides and output couplers that overlap the front-facing display and wherein the waveguides and the output couplers are configured to convey the images produced by the display projectors to the front eye boxes.

16. An accessory configured to operate with a head-mounted device having lenses, rear-facing displays configured to display images in rear eye boxes through the lenses in a first direction, and a front-facing display configured to display an image in a second direction opposite to the first direction, the accessory comprising:
  an attachment structure configured to removably attach the accessory to the front-facing display; and
  a plurality of partially reflective panels each configured to reflect an adjacent image from the front-facing display to produce corresponding virtual images viewable at a location between the plurality of partially reflective panels.

17. The accessory defined in claim 16 wherein the attachment structure comprises a magnet.

18. The accessory defined in claim 16 wherein the attachment structure comprises a magnet and wherein the head-mounted device is configured to detect when the attachment structure is attached to the front-facing display by sensing the magnet.

19. The accessory defined in claim 16 wherein the plurality of partially reflective panels comprise transparent layers configured to form a hollow pyramidal structure and wherein the virtual images are at a location inside the hollow pyramidal structure.

20. A head-mounted device configured to operate with a removable accessory having a reflective layer, comprising:
  a head-mounted support structure;
  rear-facing displays supported by the head-mounted support structure that are configured to display visual content to rear eye boxes, wherein the rear-facing displays each comprise a pixel array;
  a front-facing display that faces away from the rear eye boxes and that is configured to display a front-facing image, wherein the pixel arrays of the rear-facing displays are disposed between the front-facing display and the rear eye boxes; and
  a sensor configured to detect presence of the accessory against the front-facing display, wherein the front-facing display is configured to provide the front-facing image towards the reflective layer in the accessory when the accessory is against the front-facing display.

21. The head-mounted device defined in claim 1 wherein the optical system overlaps the front face of the head-mounted support structure and is configured to convey image light of the three-dimensional image in an outward direction away from the front face of the head-mounted support structure and wherein the left and right rear-facing displays each comprise a pixel array.

* * * * *